United States Patent
Seidel et al.

(10) Patent No.: US 8,871,961 B2
(45) Date of Patent: Oct. 28, 2014

(54) PROCESS FOR PRODUCTION OF BIODIESEL

(75) Inventors: Eckhard Seidel, Frankfurt (DE); Rudolf Boensch, Nackenheim (DE); Norbert Palauschek, Idstein (DE); Helmut Saft, Niddatal (DE)

(73) Assignee: Air Liquide Global E&C Solutions Germany GmbH, Frankfurt am Main (DE)

( * ) Notice: Subject to any disclaimer, the term of this patent is extended or adjusted under 35 U.S.C. 154(b) by 171 days.

(21) Appl. No.: 13/696,111

(22) PCT Filed: Mar. 2, 2011

(86) PCT No.: PCT/DE2011/000209
§ 371 (c)(1),
(2), (4) Date: Nov. 5, 2012

(87) PCT Pub. No.: WO2011/144192
PCT Pub. Date: Nov. 24, 2011

(65) Prior Publication Data
US 2013/0053591 A1    Feb. 28, 2013

(30) Foreign Application Priority Data

May 20, 2010 (DE) .......................... 10 2010 022 139

(51) Int. Cl.
| | | |
|---|---|---|
| *C11C 3/04* | (2006.01) | |
| *C11B 3/10* | (2006.01) | |
| *B01J 49/00* | (2006.01) | |
| *C10L 1/02* | (2006.01) | |
| *C11C 1/08* | (2006.01) | |
| *C11C 3/00* | (2006.01) | |

(52) U.S. Cl.
CPC ........ *C11C 3/003* (2013.01); *C10G 2300/1011* (2013.01); *C10L 1/026* (2013.01); *C11C 1/08* (2013.01); *Y02E 50/13* (2013.01)
USPC ........... 554/169; 554/191; 554/167; 554/163; 554/175; 210/670; 210/194; 210/263; 210/269; 210/195.1

(58) Field of Classification Search
CPC .............. C11C 3/04; C11C 3/10; C11C 1/08; C10L 1/026
See application file for complete search history.

(56) References Cited

U.S. PATENT DOCUMENTS 5,358,915 A * 10/1994 Nebergall et al. ............... 502/27
8,193,383 B2    6/2012 Saft et al.

(Continued)

FOREIGN PATENT DOCUMENTS

| DE | 102006044467 A1 | 4/2008 |
|---|---|---|
| DE | 102010011606 A1 | 9/2011 |

(Continued)

OTHER PUBLICATIONS

Dunn, Effects of minor constituents on cold flow properties and performance of biodiesel, Progress in Energy and Combustion Science, Elsevier Science Publishers, Amsterdam, NL—ISSN 0360-1285, Dec. 1, 2009, vol. 35, Nr:6, pp. 481-489.

(Continued)

*Primary Examiner* — Yate K Cutliff
(74) *Attorney, Agent, or Firm* — Leydig, Voit & Mayer, Ltd.

(57) ABSTRACT

A process for continuous production of biodiesel from vegetable oils or animal fats by transesterification with methanol or ethanol to give crude fatty acid alkyl esters, subsequent washing with water in a wash column to remove water-soluble impurities, subsequent drying by vaporization of the water content and subsequent removal of steryl glycosides by adsorption onto calcium bentonite, wherein the adsorption column(s) used is/are regenerated in a first step, for desorption of the steryl glycosides, by rinsing with a mixture consisting of fatty acid alkyl esters and methanol or ethanol, and in a subsequent second step, for removal of methanol residues, by rinsing with fatty acid alkyl esters or with gaseous nitrogen or carbon dioxide.

23 Claims, 1 Drawing Sheet

(56) References Cited

U.S. PATENT DOCUMENTS

| | | |
|---|---|---|
| 2009/0199460 A1 | 8/2009 | Munson et al. |
| 2011/0154723 A1 | 6/2011 | Sohling et al. |
| 2013/0012732 A1 | 1/2013 | Seidel et al. |

FOREIGN PATENT DOCUMENTS

| | | |
|---|---|---|
| WO | WO 2007076163 A2 | 7/2007 |
| WO | WO 2009080287 A2 | 7/2009 |
| WO | WO 2009132670 A1 | 11/2009 |

OTHER PUBLICATIONS

European Patent Office, International Search Report in International Patent Application No. PCT/DE2011/000209 (Jul. 5, 2011).

"The Role of Sterol Glucosides on Filter Plugging", Inmok, Lee et al., Biodiesel Magazine, Apr. 2007.

* cited by examiner

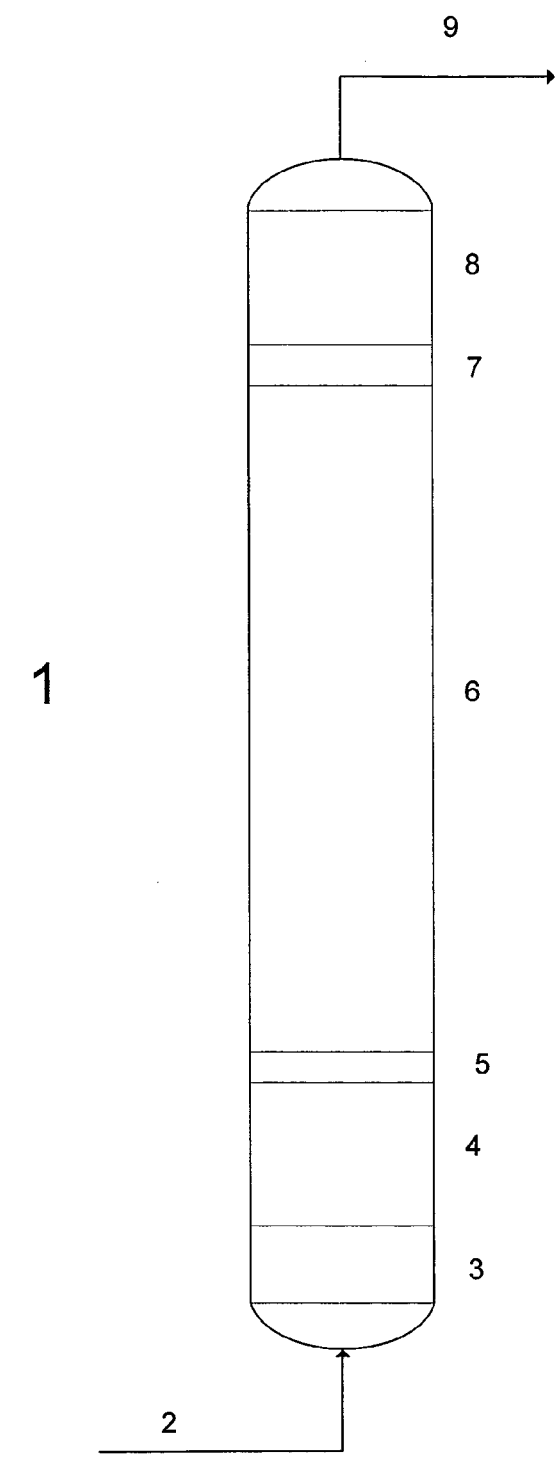

PROCESS FOR PRODUCTION OF BIODIESEL

CROSS REFERENCE TO RELATED APPLICATIONS

This application is a U.S. National Phase application under 35 U.S.C. 0371 of International Application No. PCT/DE2011/000209, filed on Mar. 2, 2011, and claims benefit to German Patent Application No. DE 10 2010 022 139.2, filed on May 20, 2010. The International Application was published in German on Nov. 24, 2011, as WO 2011/144192 A1 under PCT Article 21 (2).

FIELD

This application relates to a method for producing fatty acid alkyl ester for use as biodiesel from vegetable oils or animal fats by transesterification of the triglycerides contained in the fats or oils with methanol or ethanol in the presence of an alkaline catalyst to crude fatty acid alkyl ester, subsequent washing of the crude fatty acid alkyl ester with water to remove water-soluble impurities such as soaps, glycerol residues and salts, subsequent drying by heating at atmospheric pressure or negative pressure for evaporating the water content, and subsequent removal of dissolved stearyl glycosides by adsorption.

BACKGROUND

Methods for producing biodiesel by transesterification of vegetable oils or animal fats are known e.g. from DE 10 2006 044 467 B4.

Furthermore, for example from the specialist article "The Role of Sterol Glucosides on Filter Plugging", Inmok, Lee et al., Biodiesel Magazine, April 2007, it is known that in the transesterification of natural fats or oils with alkyl alcohol the stearyl glycosides naturally present in the fats or oils largey lose their solubility both in oil or fat and in the fatty acid alkyl ester obtained by transesterification, so that they are precipitated as fine suspended particles and in use of the fatty acid alkyl ester as biodiesel lead to cloggings of the diesel filters and to deposits in the engine.

Methods for removing the stearyl glycosides from the fatty acid alkyl ester obtained by transesterification by means of adsorption are also known.

In WO 2009/132670 a method for purifying biodiesel is presented, in which an adsorbent containing a smectite-silica gel mixed phase is especially used for removing stearyl glycosides. In the examples described in this document, calcium bentonite as comparative material is used as adsorbent. The experiments were carried out in that the adsorbent, at room temperature, was stirred into the fatty acid alkyl ester to be purified and subsequently was filtered off. There was measured a distinctly lower adsorption capacity with respect to stearyl glycosides of the calcium bentonite as compared to a smectite-silica gel mixed phase.

For regenerating the adsorption column, mixtures of alkanes or chlorinated hydrocarbons are proposed in this document, WO 2009/132670, and the use of a mixture of chloroform and methanol in the experiment is described. In particular the chlorinated hydrocarbons and chloroform are substances with a high hazard potential for health and environment.

Therefore, it has been an object to develop a method for producing biodiesel, in which the removal of the sterol glycosides is effected by using inexpensive adsorbents, such as bleaching earths, but which can do without these dangerous auxiliaries for regenerating the adsorbents.

SUMMARY

An object of the invention is achieved by method for producing a fatty acid alkyl ester from a vegetable oil or animal fat, comprising: (1) transesterifying a triglyceride comprised in the fat or oil with methanol or ethanol in the presence of an alkaline catalyst, to obtain a crude fatty acid alkyl ester; (2) subsequently, washing the crude fatty acid alkyl ester with water to remove a water-soluble impurity, to obtain a washed ester and a wash fraction; (3) subsequently, drying the washed ester by heating at atmospheric pressure or negative pressure, thereby reducing a water content of the washed ester, to obtain a dried ester; (4) subsequently, removing a dissolved stearyl glycoside by adsorption in the presence of at least one adsorbent comprising a clay mineral; and (5) regenerating the at least one adsorbent, from a loaded absorbent, which is loaded with a loading composition comprising a stearyl glycoside, by treating the loaded adsorbent with an ester-alcohol mixture comprising a fatty acid alkyl ester, a fatty acid alcohol, or a combination thereof.

BRIEF DESCRIPTION OF THE DRAWING

FIG. 1 shows the construction of an adsorption column.

DETAILED DESCRIPTION

In an embodiment of the invention, an adsorption is carried out in the presence of at least one adsorbent on the basis of clay mineral and the regeneration of the adsorbent or adsorbents loaded with stearyl glycosides substantially is effected by treatment with a fatty acid alkyl ester/alcohol mixture.

Own experiments have shown that calcium bentonite, unless it is stirred into the fatty acid alkyl ester, as described in WO 2009/132670, but is used as granulate bed in an adsorption column, very well represents a suitable adsorbent for removing stearyl glycosides.

Therefore, an advantageous variant of the invention consists in using bentonite, preferably calcium bentonite, as adsorbent.

Furthermore, it was found to be advantageous to use methanol or ethanol as alcohol in the mixture used for regeneration, depending on with which alcohol the transesterification was carried out, and to adjust a weight content ratio of fatty acid alkyl ester to methanol between 19:1 and 1:1, preferably between 9:1 and 4:1.

To remove methanol residues from the adsorbent after the regeneration, it is advantageous to rinse the same with an inert gas, preferably nitrogen or carbon dioxide or mixtures thereof.

It is advantageous to continuously carry out the purification of the produced fatty acid alkyl ester by adsorption and for this purpose connect at least two adsorption columns in parallel, so that at the same time the adsorption can be carried out in at least one adsorption column and the regeneration can be carried out in at least one further adsorption column.

For the adsorption of the stearyl glycosides operating temperatures in the range between 60 and 150° C. were found to be advantageous, and for the regeneration of the adsorbent or adsorbents temperatures in the range from 40 to 60° C.

To recover the fatty acid alkyl ester contained in the fatty acid alkyl ester/methanol mixture used for regeneration, a method is advantageous in which in a first step the methanol fraction is separated from the fatty acid alkyl ester fraction by distillation, wherein the stearyl glycosides remain in the ester fraction, and in a second step, according to the German Patent Application 10 2010 011 606.8, by mixing a strong acid into the fatty acid alkyl ester or by contacting the fatty acid alkyl ester with an acidically acting ion exchanger, the stearyl glycosides are split into their stearyl and their sugar fraction and subsequently the processed fatty acid alkyl ester is introduced into the wash of the crude fatty acid alkyl ester, with the sugar fraction passing over into the washing water phase.

Further developments, advantages and possible applications of the invention can also be taken from the following description of an application example and the drawing. All features described and/or illustrated form the subject-matter of the invention per se or in any combination, independent of their inclusion in the claims or their back-reference.

In the following Example 1, in conjunction with the drawing FIG. 1, that part of the method of the invention will be explained which deals with the adsorption of the stearyl glycosides on calcium bentonite and with the subsequent desorption.

When carrying out the example, the following measurement and analysis methods were employed:
determination of fatty acid methyl ester, DIN EN 14103;
determination of stearyl glycosides, sterols, DIN EN 14105; and
determination of methanol, DIN EN 14110.

For the adsorption and desorption experiment, a double-walled glass cylinder with a length of 80 cm and an inside diameter of 5 cm was used. The double jacket, with which the column was equipped for heating, is not shown in FIG. 1.

The biodiesel to be purified enters into the column from below via conduit (2). The column is composed of the following layers:
(3) a 5 cm thick layer of glass beads; the diameter of the beads is 10 mm;
(4) a 12 cm thick layer of glass beads; the diameter of the beads is 4 mm;
(5) a 2 cm thick layer of glass wool;
(6) a 37 cm thick layer of calcium bentonite powder, bulk density 630 g/l, grain size distribution (dry screening analysis): >1.0 mm: 5.0% max., >0.2 mm: 5.0%;
(7) a 2 cm thick layer of glass wool; and
(8) a 7 cm thick layer of glass beads; the diameter of the beads is 4 mm.

Via conduit (9), the biodiesel exited from the column. The biodiesel was fatty acid methyl ester produced from palm oil by transesterification with methanol, which had been washed with water in a washing column and subsequently dried at 110° C. to a water content of 107 ppm, and whose stearyl glycoside content was 116 ppm.

The biodiesel standard EN 14214 limits the admissible total contamination of the biodiesel to 24 ppm. Since other impurities, such as soaps and salts, have largely been removed from the crude biodiesel by the preceding water wash, it can be assumed that the impurities still present after the water wash substantially are stearyl glycosides, so that the admissible content of 24 ppm largely can be utilized by the same.

In the first adsorption step, the biodiesel was passed through the column at an operating temperature of 80° C. with 0.7 l/h. After leaving the column, the stearyl glycoside content in the biodiesel was 19 ppm in the first three operating hours, and 9 ppm in the 4th to 19th operating hour. After the 19th operating hour, the stearyl glycoside content rose, which showed that the adsorption capacity of the adsorption column was exhausted.

In the first desorption step, the column subsequently was traversed, at an operating temperature of 60° C., by a mixture of fatty acid methyl ester and methanol, with a weight-related mixing ratio of 4:1 for 2 hours with a flow rate of 0.3 l/h, in the same direction as in the adsorption step. Subsequently, the column was rinsed with a nitrogen stream of 0.3 l/h at an operating temperature of 80° C., in order to remove methanol residues.

In the second adsorption step, the biodiesel was passed through the column at an operating temperature of 50° C., with 0.7 l/h. After leaving the column, the stearyl glycoside content in the biodiesel constantly was 21 ppm from the 1st to the 19th operating hour.

Thereafter, the stearyl glycoside content rose again, so that another desorption step was required.

This cycle of adsorption and desorption could be repeated up to twenty times, with the loadability of the adsorbent however decreasing in time, so that with increasing number of cycles the adsorption capacity of the adsorbent already was exhausted after less than 19 operating hours.

While the invention has been illustrated and described in the foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the attached claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise.

The invention claimed is:

1. A method for producing a fatty acid alkyl ester from a vegetable oil or animal fat, the method comprising:
   (1) transesterifying a triglyceride comprised in the fat or oil with methanol or ethanol in the presence of an alkaline catalyst, to obtain a crude fatty acid alkyl ester;
   (2) subsequently, washing the crude fatty acid alkyl ester with water to remove a water-soluble impurity, to obtain a washed ester and a wash fraction;
   (3) subsequently, drying the washed ester by heating at atmospheric pressure or negative pressure, thereby reducing a water content of the washed ester, to obtain a dried ester;
   (4) subsequently, removing a dissolved stearyl glycoside present in the dried ester by adsorption in the presence of at least one adsorbent comprising a clay mineral; and
   (5) regenerating the at least one adsorbent, from a loaded absorbent, which is loaded with a loading composition comprising a stearyl glycoside, by treating the loaded adsorbent with an ester-alcohol mixture comprising a fatty acid alkyl ester, a fatty acid alcohol, or a combination thereof.

2. The method of claim 1, wherein the adsorbent comprises bentonite.

3. The method of claim 1, wherein the ester-alcohol mixture comprises methanol.

4. The method of claim 3, wherein the ester-alcohol mixture comprises a weight content ratio of fatty acid alkyl ester to methanol between 19:1 and 1:1.

5. The method of claim 1, wherein, subsequent to the regenerating, the removing further comprises treating the at least one adsorbent with an inert gas.

6. The method of claim 1, wherein the adsorption is carried out in at least two adsorption columns connected in parallel, wherein at the same time the adsorption is carried out in at least one adsorption column and the regenerating is carried out in at least one further adsorption column.

7. The method of claim 1, the adsorption is effected at an operating temperature between 60 and 150° C.

8. The method of claim 1, wherein the regenerating effected at an operating temperature of 40 to 60° C.

9. The method of claim 1, wherein the ester-alcohol mixture, after the regenerating, comprises a stearyl glycoside and is processed by a method comprising:
   (i) separating an alcohol fraction from a fatty acid alkyl ester fraction by distillation, wherein stearyl glycosides remain in the fatty acid alkyl ester fraction, to obtain a fatty acid ester mixture; and
   (ii) splitting a stearyl glycoside into a stearyl alcohol fraction and a sugar fraction by mixing a strong acid into the fatty acid alkyl ester mixture.

10. The method of claim 9, further comprising passing the stearyl alcohol fraction into the wash fraction.

11. The method of claim 1, wherein the impurity comprises a soap, glycerol residue, salt, of a combination thereof.

12. The method of claim 1, wherein the adsorbent comprises calcium bentonite.

13. The method of claim 1, wherein the ester-alcohol mixture comprises ethanol.

14. The method of claim 13, wherein the ester-alcohol mixture comprises a weight content ratio of fatty acid alkyl ester to methanol between 19:1 and 1:1.

15. The method of claim 13, wherein the ester-alcohol mixture comprises a weight content ratio of fatty acid alkyl ester to ethanol between 9:1 and 4:1.

16. The method of claim 3, wherein the ester-alcohol mixture comprises a weight content ratio of fatty acid alkyl ester to methanol between 9:1 and 4:1.

17. The method of claim 5, wherein the inert gas comprises $N_2$.

18. The method of claim 1, wherein the inert gas comprises $CO_2$.

19. The method of claim 1, wherein the inert gas comprises $N_2$ and $CO_2$.

20. The method of claim 9, further comprising passing the sugar fraction into the wash fraction.

21. The method of claim 9, wherein the alcohol fraction in (i) is a methanol fraction.

22. The method of claim 1, wherein the ester-alcohol mixture, after the regenerating, comprises a stearyl glycoside and is processed by a method comprising:
   (i) separating an alcohol fraction from a fatty acid alkyl ester fraction by distillation, wherein stearyl glycosides remain in the fatty acid alkyl ester fraction, to obtain a fatty acid ester mixture; and
   (ii) splitting a stearyl glycoside into a stearyl alcohol fraction and a sugar by contacting the fatty acid alkyl ester mixture with an acidically acting ion exchanger.

23. The method of claim 22, further comprising passing the sugar fraction into the wash fraction.

\* \* \* \* \*